United States Patent [19]
Yando

[11] Patent Number: 5,827,434
[45] Date of Patent: Oct. 27, 1998

[54] APPARATUS AND METHODS FOR REDUCING AND DETERRING BIOLOGICAL CONTAMINATION

[76] Inventor: Daniel Yando, 267 Rabideau St., Cadyville, N.Y. 12918

[21] Appl. No.: 820,804

[22] Filed: Mar. 19, 1997

[51] Int. Cl.⁶ ................................. C02F 1/50; B01D 11/02
[52] U.S. Cl. .............. 210/754; 210/198.1; 210/205; 210/764; 422/263; 422/277; 137/268; 239/310
[58] Field of Search ............................ 210/198.1, 205, 210/764, 754; 422/263, 277; 137/268; 239/310

[56] References Cited

U.S. PATENT DOCUMENTS

| | | | |
|---|---|---|---|
| 4,059,522 | 11/1977 | Polley et al. | 210/198.1 |
| 4,303,515 | 12/1981 | Rademacher | 210/169 |
| 4,347,224 | 8/1982 | Beckert et al. | 422/277 |
| 4,691,732 | 9/1987 | Johnson et al. | 137/268 |
| 5,225,074 | 7/1993 | Moini | 210/169 |
| 5,447,641 | 9/1995 | Wittig | 210/756 |
| 5,507,945 | 4/1996 | Hansen | 210/198.1 |
| 5,662,795 | 9/1997 | Pickens et al. | 210/169 |

*Primary Examiner*—Neil McCarthy

[57] ABSTRACT

An apparatus and associated methods for reducing or deterring biological contamination is described. The apparatus features a housing defining a chamber and a reservoir for mixing a fluid with a barrier chemical.

20 Claims, 3 Drawing Sheets

APPARATUS AND METHODS FOR REDUCING AND DETERRING BIOLOGICAL CONTAMINATION

TECHNICAL FIELD

This application relates to the exclusion of unwanted fluid-borne biological contaminants from enclosed spaces, and is particularly advantageous for excluding a freshwater contaminant, the zebra mussel (*Dreissena polymorpha*) or the related quagga mussel (*Dreissena bugensis*), from intake pipes of home water systems, municipal water systems and the like.

BACKGROUND

Many water supplies are contaminated with biological organisms that compromise the integrity of the internal spaces of the pipes by obstructing or completely blocking fluid flows therein. In addition, many water supplies may also be contaminated with organisms that have a deleterious effect on human health. In all instances, it is desirable to eradicate existing contaminants from the water system, and to prevent recontamination of the system at a later date. Two general methods exist for increasing the purity and integrity of a water system: chemical treatment and filtration treatment. However, the approaches used to date have not provided a readily implemented solution for, e.g., the typical residential water supply.

Zebra and quagga mussels in particular pose an increasing threat to freshwater watersheds, and to the integrity of intake pipes and other enclosed spaces that open into contaminated watersheds. Zebra mussels were introduced in the Great Lakes basin of North America in the mid-1980s, and are sweeping in epidemic proportions through other areas of the United States and Canada. The mussels proliferate rapidly and do not have sufficient natural predators or other environmental pressures to keep the populations in check.

Zebra mussels begin life in an immature stage known as "veligers," which are minuscule swimming larvae. Each adult mussel generates hordes of veligers that are transported by water currents. As they mature and begin to develop shells, they begin to settle out of the water onto any available hard surface. When an immature zebra mussel contacts such a surface, it adheres with an incredibly sticky resilient thread known as a "byssal fiber." Once attached, they are very difficult to disattach while they are alive.

Water intake pipes provide an optimized environment for zebra and quagga mussels. Typically an infestation will begin with the veligers entering the pipe and settling out on the pipe interior. The pipe interior protects the mussels from predators and environmental disruptions, and provide them with nutrient-rich flows of water. In such a favorable environment, a colony of mussels can quickly multiply to form densely-packed colonies which ultimately occlude the water pipe.

Zebra mussels are known to be susceptible to chlorine, and residual chlorine levels of 0.2 ppm and above are known to kill both the adults and the veligers. Because the mussels have the capacity to sense toxins such as chlorine and to cease filtering of toxin-bearing water for up to two weeks at a time without dying, bolus injections and transient or fluctuating levels of chlorine are ineffective. Rather, a relatively steady-state concentration of toxic levels of chlorine is required over the target period in order to eradicate the existing mussels. Currently marketed devices for killing resident mussels with such steady-state delivery of chlorine utilize complicated and/or costly chemical pumping systems or chemical injection systems. Accordingly, although these systems have reported some success in eradicating resident mussel colonies, these approaches are not practical for wide-scale use in, e.g., residential water systems.

Alternatively, filter systems that exclude the veligers are currently available. However, filter systems also are costly and are susceptible to clogging, both by the mussels themselves and by other water-borne organic and/or mineral matter. In addition, the filter systems suffer from the more serious drawback of being ineffective against veligers or established mussel colonies that exist within the pipe when the filter is inserted.

Accordingly, although there exists a current and ever-worsening plague of zebra and quagga mussels, a simple and cost-effective method of eradicating existing populations and for preventing re-infestation of enclosed spaces is not currently available. This invention provides a long-awaited solution to this endemic environmental threat that is simple and practical.

SUMMARY OF THE INVENTION

The present invention provides a simple, relatively inexpensive approach to eliminating existing biological contaminants from an enclosed space such as a water intake pipe, or alternatively for preventing contamination of a contamination-free enclosed space. The invention features an apparatus that is installed at or near the end of the enclosed space. When fluid flows through the apparatus, the flow-associated forces drive a portion of the fluid through an attachment that is designed to mix the fluid with a barrier chemical that deters or kills the biological contaminant. The chemically treated fluid then is directed back into the central chamber of the apparatus, where it mixes with the residual flow that bypassed the chemical reservoir and then flows inward to the remainder of the target enclosed space. The resultant concentrations of barrier chemical in the fluid can be adjusted and optimized so as to deter or eradicate the target biological contaminant. When chemical contamination of the ecosystem of the water source is a concern, the basic design may be modified to include one or more line checks to isolate the concentrated barrier chemical within selected interior portions of the apparatus.

One operative embodiment of the claimed invention features a line check on the inlet, which then directs flow toward a juncture of the chemical reservoir and the target enclosed space. The chemical reservoir has an inlet, which may optionally be oriented transverse to the flow of fluid inward from the contaminated source. The inlet channels water into a reservoir, where it mixes with a barrier chemical. When a slow-dissolving form of the chemical is used or when large amounts of toxic chemical are required, the reservoir may be altered to provide a diffusion bed of increased size. The reservoir also features an outlet, which may be sized and shaped so as to optimize dissolution of the barrier chemical and/or diffusion of the chemically treated flow back into the untreated residual or excess flow. The ultimate flow then proceeds through the enclosed space to a target destination, and either kills any biological contaminants in the enclosed space or deters such contaminants from becoming established in the first instance. A line check may be installed on the outlet and/or inlet of the apparatus in order to isolate the concentrated barrier chemical region from the environment should the apparatus become disengaged from the target enclosed space.

The apparatus and associated methods have particular utility for combatting the infestation of fresh-water contaminants such as zebra mussels, *Dreissena polymorpha,* and the related quagga mussels, *Dreissena bugensis*. Unlike prior approaches that utilize filters, the invention solves a long-felt need by simultaneously killing existing contaminants and preventing re-infestation. Unlike existing systems for adding toxic or deterrent chemicals to the water, this design does not require expensive, complicated and/or difficult-to-install pumps, yet is capable of providing effective steady-state concentrations of barrier chemicals that are toxic to the target organism but safe for humans. In addition, the design provides for rapid and simple installation and maintenance. Finally, the design optionally provides for complete encapsulation of the toxic chemicals within an enclosed space, with no threat to the adjacent aquatic environment.

DESCRIPTION OF SPECIFIC EMBODIMENTS

FIGS. 1 through 5 provide a detailed structural description of one possible embodiment of the claimed inventions. As will be obvious to one of ordinary skill in the art, many structural variations can be made to this embodiment, while retaining equivalent functions and results.

Figure 1:
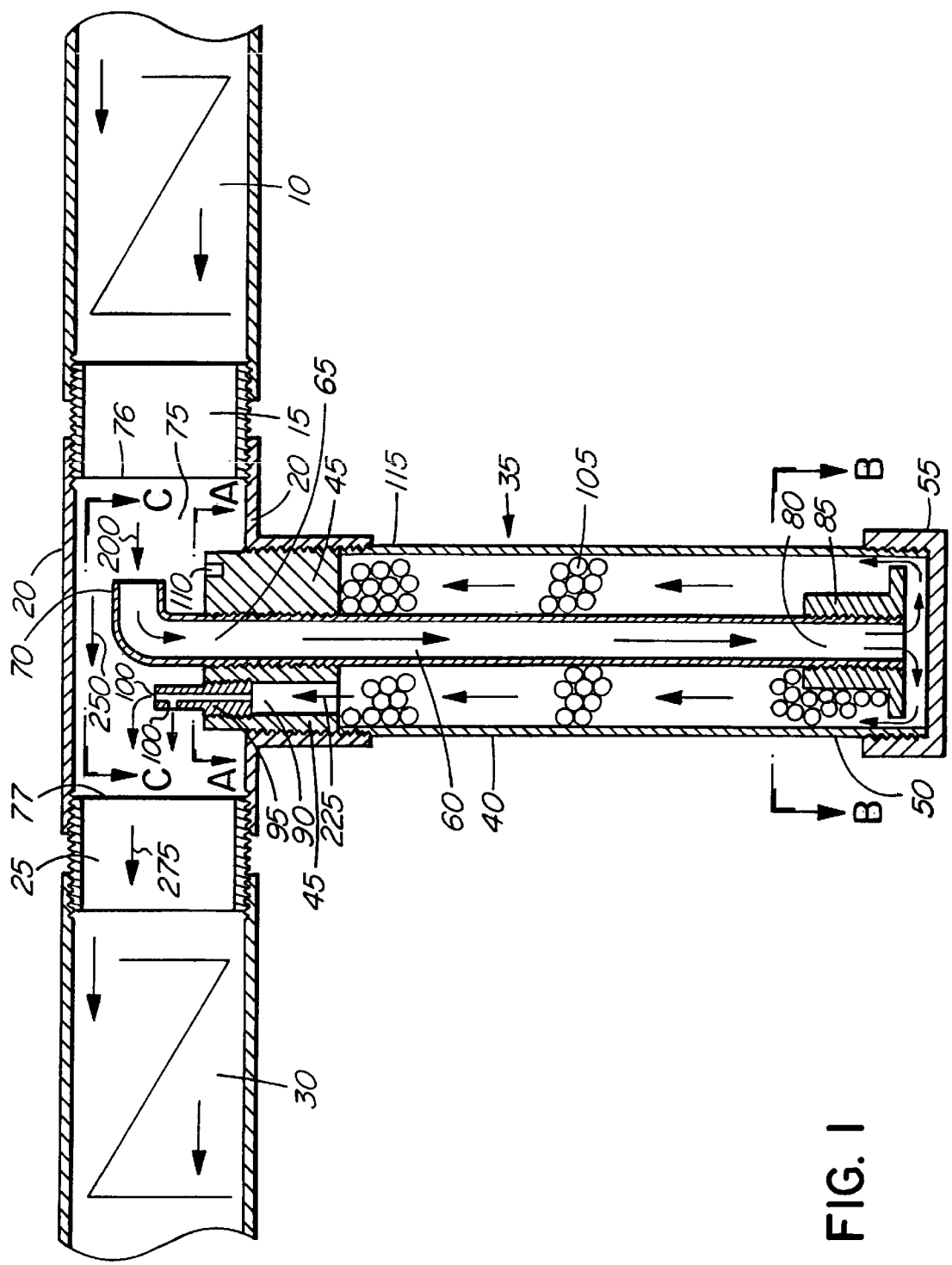
FIG. 1 is a longitudinal cross-section of one embodiment of the claimed invention, and additionally depicts the flow of water into, through, and out of the assembled apparatus.
Figure 2:
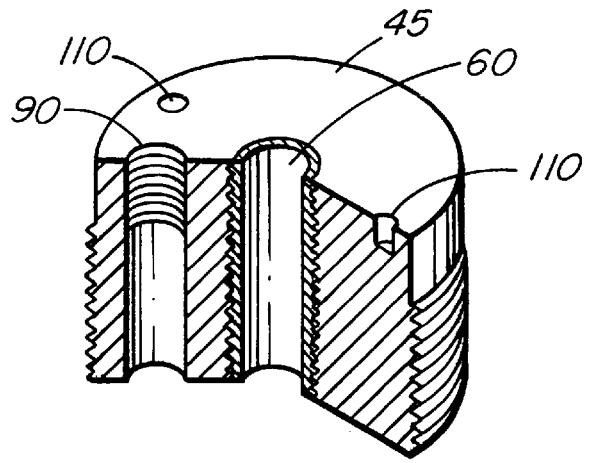
FIG. 2 is a cross-sectional perspective of the embodiment shown in FIG. 1, taken at the line marked "A", which looks distally down the reservoir from the plane of the top of the taped bushing.
Figure 3:
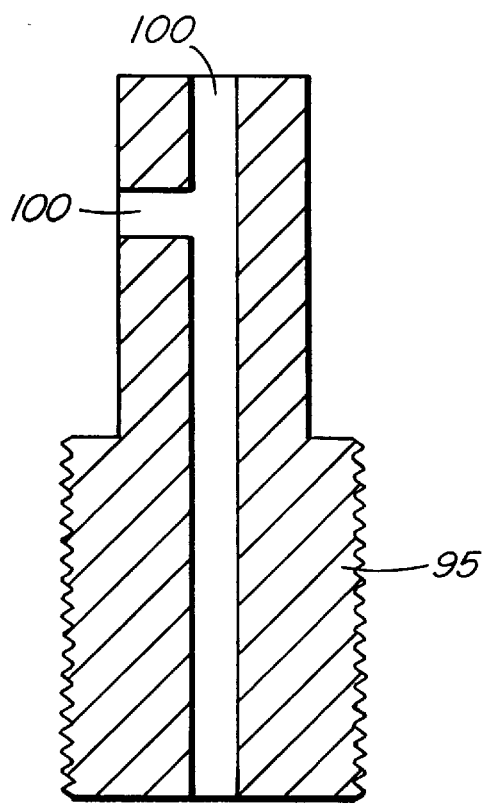
FIG. 3 is an enlargement of the jet end 95 of FIG. 1.
Figure 4:
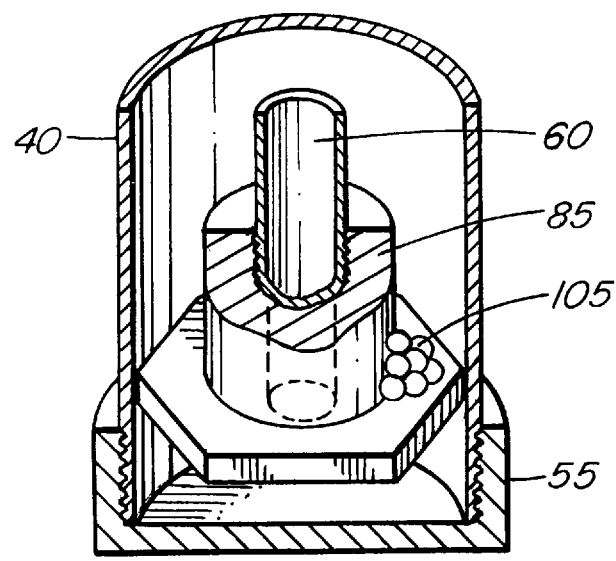
FIG. 4 is a cross-sectional perspective of the embodiment shown in FIG. 1, taken at the line marked "B", which is a cross-section of the reservoir looking distally to the stop bushing.
Figure 5:
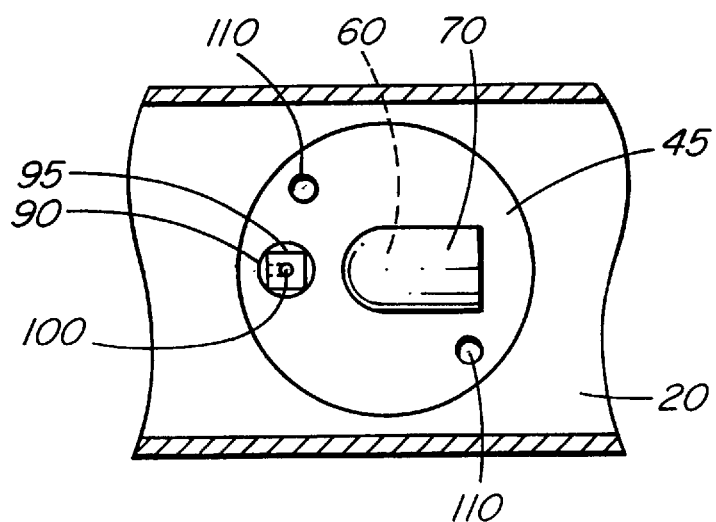
FIG. 5 is a cross-sectional perspective of the embodiment shown in FIG. 1, taken at the line marked "C", which is a perspective from within the chamber looking down upon the top of the street 90 inlet, the jet outlet, the taped bushing and the interior of the bull end of the tee.

Referring to FIG. 1, at the portion of the apparatus proximal to the contaminated water source, line check 10 is attached by short nipple 15 to a tee-shaped housing 20. Tee 20 is also attached by a second short nipple 25 to a second line check 30, distal to the contaminated water source. Tee 20 also is attached to a chemical reservoir, generally depicted as 35. The chemical reservoir is formed by long nipple 40, which is attached to tee 20 by taped bushing 45. At the distal end 50 of the chemical reservoir 35, removable cap 55 is attached to long nipple 40. In this embodiment, the chemical reservoir also includes a conduit or small nipple 60 for directing flow of water to the distal end 50 of the chemical reservoir 35. In this embodiment, the proximal end 65 of the conduit 60 features a "street 90" 70 to provide an inlet to the chemical reservoir that is transverse to the direction of water flow through chamber 75, which is from the first fluid aperture of the chamber 76 to the second fluid aperture of the chamber 77. The distal end 80 of the conduit 60 is attached to stop bushing 85. The chemical reservoir additionally includes an outlet, generally designated 90, which in this embodiment features end 95, which is a jet having openings 100 to chamber 75. In this embodiment, the diameter or flow area of the outlet 90 is smaller than that of the inlet 70. The flow of water through the chlorine bed slows as a result, thereby enhancing absorption of the barrier chemical. The chemical reservoir in this embodiment contains chlorine tablets 105, which are suitable for gradual dissolution in the water flowing through. The structural components of this embodiment are of stainless steel, which is strong and rigid and is a suitable material for contact with chlorine. However, other materials such as PFTE piping may be equally suitable to use with chlorine. When other barrier chemicals are utilized, still other materials such as plastic, copper or aluminum may be suitable.

The chemical reservoir 35 may be attached to tee 20 in the following manner. Jet end 95 and small nipple conduit 60 with street 90 70 are installed in the corresponding receptacles in taped bushing 45. Using spanner wrench holes 110, this assembly is installed into the long nipple 40. Chlorine tablets 105 are placed inside long nipple 40, and stop bushing 85 is attached to small nipple 60. Cap 55 is then placed on the distal end of long nipple 40. The completed chemical reservoir assembly is then joined to the bull end of tee housing 20. The chemical reservoir is oriented so that the street 90 70 is generally transverse to the fluid flow through chamber 75.

In operation, contaminated water enters the apparatus depicted in FIGS. 1–5 through line check 10 and enters chamber 75 via nipple 15. The street 90 70 protrudes into chamber 75. Thus, once within the chamber the incoming, untreated flow is segmented into two flows: a first portion, 200, which is the reservoir flow, and a second portion, which is the bypass or residual flow 250. The Channelled reservoir flow 200 is diverted into the reservoir 35 through the inlet 70 and is routed through the conduit 60 to the distal end 50 of the reservoir 35, where the water flows out the distal end of the conduit 40. The distal end of the conduit 40 is in close proximity to the distal end 50 of the reservoir 35, which may for convenience include a removable cap 55 for providing ready access to the interior of the reservoir 35. The water flow thus changes direction and is forced backward into the reservoir 35 in a proximal direction. The water flow passes around the perimeter of stop bushing 85, which functions both to equilibrate the flow pattern and to enclose the chlorine tablets within the desired space. The stop bushing 85 can optionally be adjustable along the outside perimeter of the small nipple 60, so that when smaller volumes of barrier chemical 105 and/or more tightly packing barrier chemical carrier are utilized, the chemical can be compressed into a compact diffusion bed. The fluid flow reaches the proximal portion 115 of the interior of the reservoir, which in this embodiment is formed by a taped bushing 45 which joins the bull end of the tee 20. Once at the proximal end, the fluid is forced through the outlet 90 and into jet 95, for dispersion through jet apertures 100, which may vary in size, shape, number and orientation.

Once the chemically treated flow 225 exits the reservoir, it re-enters the chamber 14, where it rejoins and diffuses into the bypass flow 250 which did not enter the reservoir inlet. The two flows mix, and the chemical equilibrates in the destination flow 275 which flows outward through short nipple 25 and line check 30 and into the target enclosed space.

When the barrier chemical is chlorine and the target biological contaminants are zebra mussels or quagga mussels, stable chlorine levels of 0.2 ppm or more are believed to kill both veligers and adult mussels. After death, the adults disattach from the interior of the pipe, and are swept inward where they are pulverized by the fluid intake pump. The provision of a generally uniform concentration of chlorine is important because zebra mussels are able to avoid the toxic effects of transient doses of chlorine. For water that is to be consumed by humans, it is desirable to maintain a chlorine level that does not exceed the applicable governmentally recommended or mandated levels of chlorine, e.g., 0.8 ppm. Alternatively, a filter for removing excess or residual chlorine may be placed in any line from which drinking water is drawn.

In contrast to existing systems which require a separate chemical pump, in the present invention the fluid flow contacts the street 90 70 of inlet 65, and the pressure of the water flow drives a portion of the fluid 200 into the chemical reservoir. In addition, the passage of the residual flow 250 of the water past the outlet apertures 100 creates an additional force (the Bernoulli effect) which sucks or pulls the reservoir flow 200 through the chemical diffusion bed and out through the outlet. The combination of the Bernoulli forces and the direct pressure of water entering the street 90 combine to provide sufficient force to ensure a continual flow of water through the chemical reservoir, thereby ensuring a continual diffusion of barrier chemical into the water in the reservoir and, ultimately, in the destination flow 275. Thus the apparatus of the claimed invention provides simple and cost-effective chemical treatment of a residential water intake pipe, or other such enclosed space.

This embodiment of the claimed invention features a cylindrical reservoir 35 attached to the tee 20 in a generally perpendicular manner. The reservoir features a conduit 60 to transport the reservoir flow 200 to the distal end 50 of the reservoir, thereby maximizing contact between the channelled flow 200 and chlorine tablets 105 and thereby enhancing dissolution of the chlorine. After the fluid passes over the entire bed of chlorine tablets, it reaches the outlet 90, where it exits reservoir 35. Other embodiments of this feature may readily be implemented. For example, the reservoir may feature different shapes, lengths and orientations, and the reservoir may also provide some internal segmenting or architecture to either maximize turbulence of flow within the chemical diffusion bed or to segment and compartmentalize the barrier chemical carrier within the reservoir. Alternatively, if the barrier chemical and/or its formulation permits (e.g. readily diffuses in a controlled manner from a suitably compact carrier), a diffusion bed may not be necessary and the reservoir could feature a very small compartment providing for minimized transfer volume between the inlet and outlet.

As shown in the embodiment of FIGS. 1–5, line checks 10 and 30 may be added to the device in order to minimize any chemical contamination of the environment. Generally these line checks are spring-loaded and are vacuum- or flow-actuated.

The line check 10 (the inlet check) provides one-directional flow of fluid through the device, and prevents any backflow of chemically treated fluid from the chamber back into the water source during periods when there is no inward flow through the system. Line check 10 may be an addition to an existing foot valve of a residential water system, or alternatively may be the foot valve.

When line check 10 is in direct contact with the fluid source, it may be additionally advantageous to increase the diameter of the line check in relation to an attached residential intake pipe to decrease the rate of flow through the outermost juncture of the enclosed area and the water source. For example, in a residential water system having a 1 inch inlet pipe, a 2 or 3 inch diameter foot valve would decrease the perceived flow rate at the juncture of the residential water system. This is believed to be an advantage in that zebra mussels are believed to be attracted to and/or are preferentially gathered by, fast-flowing fluid intakes through pipes of relatively small diameter.

A second line check 30 may also be added to the claimed apparatus. The addition of line check 30 (the outlet check) provides additional protection to the environment by ensuring that the barrier chemical is contained in the event of the enclosed space distal to the outlet check becoming severed. This optional compartmentalization of chemical treatment is designed to insure that no life forms other than the unwanted biological contaminants entering the inventive apparatus are harmed by the chemical treatment.

Additional line checks may be provided for the reservoir to ensure that fluid containing the toxic barrier chemical moves through to inlet 70 and/or through outlet 90 only when appropriate fluid flow and pressure conditions exist. These additional reservoir line checks will further compartmentalize the flow of fluid within the apparatus. These additional line checks also serve to minimize the volume into which the barrier chemical diffuses during periods of no inward flow, and thus are expected to minimize any upward spikes of barrier chemical concentration in the destination flow after prolonged periods of fluid stagnation or stasis within the enclosed space.

The apparatus of the claimed invention can be installed and/or supplied with barrier chemical on an annual or biannual basis. This can easily be done in conjunction with an annual or biannual servicing of an existing footvalve on a residential water system. Because the apparatus of the present invention is designed to provide a steady supply of chlorine or other such chemical that is toxic to mussels for at least a sufficient amount of time to eradicate the population then existing in the enclosed space (believed to be approximately two weeks), annual or biannual treatment of a residential water system is believed to be sufficient to maintain the integrity of the enclosed spaces in the presence of a water source that is contaminated with zebra or quagga mussels. Alternatively, should more frequent or even constant treatment of the water source be desired, the invention readily provides for this by either allowing for increased capacity of the reservoir and/or the nature of the carrier of the barrier chemical housed within, or by more frequent maintenance of the device, which is facilitated by the simplicity of the design.

This apparatus is readily adaptable for carriers other than tablets, and for barrier chemicals other than chlorine. For example other halogens (Group VIIA compounds on the periodic table of the elements) may be implemented, and specifically bromine and iodine are known to be effective against many common biological contaminants. In addition, materials which are known or believed to deter zebra mussels, such as zinc, may have utility in this invention.

The device may also eradicate other unwanted contaminants. For example, providing a chlorine concentration of 1.0–10.0 mg/L is believed to eradicate algae from a water system. The invention may also provide a ready method of eradicating another problem contaminant of fresh-water drinking supplies, known generally as giardia. Chlorination may also eradicate a variety of other disease-causing organisms. Thus the present invention may not only maintain integrity of a residential water pipe by eradicating zebra and quagga mussels, it may also optimize the safety for human consumption of the resultant water provided to the residential destination.

EXAMPLES

A device substantially as depicted in FIGS. 1–5 was installed at the end of a 1 and ¼ inch diameter intake pipe of residential water supply "X." The intake pipe drew water from a large freshwater lake contaminated by zebra mussels. The residential water supply used a standard Myers HJ75F, ¾ hp shallow well jet type pump, triggered by a 30 psi/50 psi pressure switch. When an occupant of residence "X" drew water from the system, e.g., by turning on the tap in the kitchen sink, the water pump engaged and drew lake water through the foot valve and into the inlet pipe. The lake water then passed through a 1 and ½ inch diameter stainless steel line check and passed through an inlet nipple (1 and ½"×2") and entered the interior of an adjoined 1 and ½ inch diameter stainless steel "T" joint. A portion of the lake water then entered a ¼ inch diameter stainless steel "street 90" which was joined to an interior stainless steel reservoir or small nipple via a bushing, described further hereafter. The water then passed through this interior stainless steel small nipple, which was ¼ inch in diameter and 5 and ½ inches in length, to the distal end of the reservoir, the housing of which was formed by a stainless steel long nipple, which was 1 and ½ inches in diameter and 6 inches in length. Prior to installation onto the residential line, approximately 120 Repak™ tablets (70% available chlorine per tablet) were inserted into the interior reservoir cavity between the small nipple and the long nipple, a 1"×¼" stainless steel stop bushing was screwed onto the distal end of the small nipple, and a 1 and ½ inch diameter stainless steel cap was screwed onto the distal end of the long nipple. The lake water thus flowed into the tee and a portion was diverted to flow through the reservoir attachment, where it mixed with chlorine tablets. The chlorinated water then flowed out of the reservoir and mixed with the bypass or excess flow to form the chlorinated destination flow, and passed out through an outlet nipple (1 and ½"×2") and outlet check. Within one hour, the device provided a concentration of 0.5 ppm in the water inside the residence, as measured by a residual free chlorine test.

A second residence, "Y," received another prototype of the type installed at "X," and achieved similar concentrations within one hour after an adjustment was made to the reservoir structure. Residence "Y" used a 1" diameter intake line and a Gould J05S ½ hp pump with 30/50 psi pressure switch.

Residences "X" and "Y" both periodically monitored the residual free chlorine levels and reported that the concentrations were maintained at 0.5–0.8 ppm for 18 and 19 days, respectively (higher levels occurring when the pump system was not activated for longer time periods, e.g. overnight). Notably, these chlorine levels were achieved quickly and easily and without the use of a separate pump to add the chlorine to the residential water flow—the suction provided by the residential water pump provided sufficient flow within the main line to passively create a flow through the chemical reservoir attachment.

The invention now being fully described, it will be apparent to one of ordinary skill in the art that many changes and modifications can be made thereto without departing from the spirit or scope of the appended claims.

What is claimed is:

1. An apparatus for reducing or deterring biological contamination in an enclosed space, comprising:

a housing defining a chamber including a first fluid aperture in communication with a source of biologically contaminated fluid and a second fluid aperture in communication with a destination;

a reservoir including an inlet and an outlet in fluid communication with said chamber and arranged such that a partial portion of a fluid flow from said source of biologically contaminated fluid is directed through said inlet to said reservoir and back through said outlet to said chamber;

said reservoir comprising a conduit extending from a first end proximal to the source of biologically contaminated fluid to a second end distal to said source of biologically contaminated fluid, said first end comprising said inlet for receiving said partial portion and said conduit delivering said partial portion to said second end; said second end comprising means for diverting said partial flow from said conduit in a direction transverse to said conduit and into an interior of said reservoir, said interior of said reservoir containing a barrier chemical and defining a path for flowing said partial portion through said interior in a direction substantially opposite to its flow in said conduit, in contact with said barrier chemical, and to said outlet; and said barrier chemical releasing into said partial portion of said fluid flow passing through said reservoir, so that said partial portion of said fluid flow returning back to said chamber contains a quantity of barrier chemical sufficient to reduce or deter said biological contamination in said enclosed space.

2. The apparatus of claim 1 further including an inlet check.

3. The apparatus of claim 2 wherein a flow area of said inlet check is larger than a flow area of a remainder of said enclosed space.

4. The apparatus of claim 1 further including an outlet check.

5. The apparatus of claim 1 further including a reservoir inlet check.

6. The apparatus of claim 1 further including a reservoir outlet check.

7. The apparatus of claim 1 wherein said inlet of said reservoir is transverse to said fluid flow moving to said chamber through said first aperture.

8. The apparatus of claim 1 wherein the flow area of said outlet is smaller than the flow area of said inlet.

9. The apparatus of claim 1 wherein said barrier chemical is a halogen.

10. The apparatus of claim 9 wherein said halogen is chlorine.

11. The apparatus of claim 10 wherein the concentration of chlorine at said destination is at least 0.2 ppm residual chlorine.

12. The apparatus of claim 1, further comprising an inlet check and an outlet check.

13. A method for reducing biological contamination in an enclosed space, comprising the steps of:

providing a housing defining a chamber including a first fluid aperture in communication with a source of untreated fluid and a second fluid aperture in communication with a destination;

providing a reservoir including an inlet and an outlet in fluid communication with said chamber and arranged such that at least a partial portion of a fluid flow from said source of untreated fluid is directed through said inlet to said reservoir and back through said outlet to said chamber;

said reservoir comprising a conduit extending from a first end proximal to the source of untreated fluid to a second end distal to said source of untreated fluid, said first end comprising said inlet for receiving said partial portion, delivering said partial portion through said conduit to said second end and then through means at said second end for diverting said partial flow from said conduit in a direction transverse to said conduit and into an interior of said reservoir, said interior of said reservoir containing a barrier chemical and defining a path for flowing said partial portion through said interior in a direction substantially opposite to its flow in said conduit, in contact with said barrier chemical, and to said outlet; and releasing said barrier chemical into said partial portion of said fluid flow passing through said reservoir, so that said partial portion of said fluid flow returning back to said chamber contains a quantity of barrier chemical sufficient to reduce biological contamination in said enclosed space.

14. The method of claim 13, further including the step of providing an inlet check.

15. The method of claim 14, further having the step of providing an outlet check.

16. The method of claim 13, wherein the quantity of said barrier chemical provides at least 0.2 ppm residual chlorine to said destination and said biological contamination is *Dreissena polymorpha*.

17. A method of deterring biological contamination in an enclosed space, comprising the steps of:

providing a housing defining a chamber including a first fluid aperture in communication with a source of biologically contaminated fluid and a second fluid aperture in communication with a destination;

providing a reservoir including an inlet and an outlet in fluid communication with said chamber and arranged such that at least a partial portion of a fluid flow from said source of biologically contaminated fluid is directed through said inlet to said reservoir and back through said outlet to said chamber;

said reservoir comprising a conduit extending from a first end proximal to the source of biologically contaminated fluid to a second end distal to said source of biologically contaminated fluid, said first end comprising said inlet for receiving said partial portion, delivering said partial portion through said conduit to said second end and then through means at said second end for diverting said partial flow from said conduit in a direction transverse to said conduit and into an interior of said reservoir, said interior of said reservoir containing a barrier chemical and defining a path for flowing said partial portion through said interior in a direction substantially opposite to its flow in said conduit, in contact with said barrier chemical, and to said outlet; and releasing said barrier chemical into said partial portion of said fluid flow passing through said reservoir, so that said partial portion of said fluid flow returning back to said chamber contains a quantity of barrier chemical sufficient to reduce or deter said biological contamination in said enclosed space.

18. The method of claim 17, further including the step of providing an inlet check.

19. The method of claim 18, further having the step of providing an outlet check.

20. The method of claim 17, wherein the quantity of said barrier chemical provides at least 0.2 ppm residual chlorine to said destination and said biological contamination is *Dreissena polymorpha*.

* * * * *